United States Patent [19]

Lamson

[11] Patent Number: 4,730,783
[45] Date of Patent: Mar. 15, 1988

[54] TAPE MEASURE

[75] Inventor: Robert D. Lamson, Seattle, Wash.

[73] Assignee: Spencer Products Company, Seattle, Wash.

[21] Appl. No.: 762,699

[22] Filed: Aug. 5, 1985

Related U.S. Application Data

[63] Continuation-in-part of Ser. No. 537,638, Sep. 30, 1983, abandoned, which is a continuation-in-part of Ser. No. 352,127, Feb. 25, 1982, abandoned.

[51] Int. Cl.[4] .................. B65H 75/48; G01B 3/10
[52] U.S. Cl. .................... 242/84.8; 33/138; 242/107.3; 242/107.5
[58] Field of Search ............. 242/84.8, 107.3, 107.5, 242/107.6, 107.7; 33/138

[56] References Cited

U.S. PATENT DOCUMENTS

| | | | |
|---|---|---|---|
| 2,172,043 | 9/1939 | Wolf | 242/107.6 |
| 2,997,250 | 8/1961 | Collins | 242/107.5 |
| 3,054,573 | 9/1962 | Spencer | 242/107.5 |
| 3,150,843 | 9/1964 | Cordoba et al. | 242/107 |
| 3,450,367 | 6/1969 | Edgell | 242/84.8 |
| 3,547,371 | 12/1970 | Gruseck | 242/107 |
| 3,657,491 | 4/1972 | Ryder et al. | |
| 3,812,588 | 5/1974 | Bennett | 242/84.8 X |
| 4,068,383 | 1/1978 | Krebs | 242/107.6 |
| 4,293,058 | 10/1981 | Burton | 33/138 X |

Primary Examiner—John M. Jillions
Attorney, Agent, or Firm—Seed and Berry

[57] ABSTRACT

A gearless, open-faced, direct-drive, spring-rewound tape measure eliminates the need for a manual-rewind handle or gears to increase the spring tensioning force. A spiral spring is retained within a spring-retaining disk which is revolvable about a hub. The hub may be attached to the cover plate and the spring tension adjusted by revolving the cover plate while the spring-retaining disk remains stationary. Alternatively, the cover plate may be coupled through an input disk to revolve the spring-retaining disk and to adjust the tension of a spring which is retained within a spring-retaining well of the spring-retaining disk. In ordinary use, the cover plate is restricted from revolving by compression lock rings which sandwich the cover plate. The tape measure may include a brake to allow holding the tape in an unwound condition.

8 Claims, 10 Drawing Figures

FIG. 2
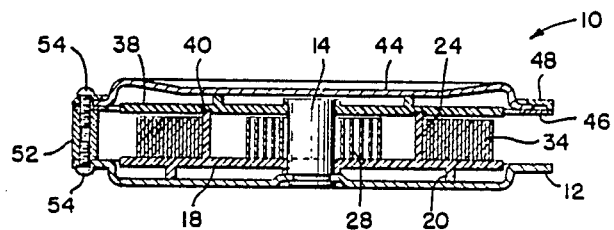
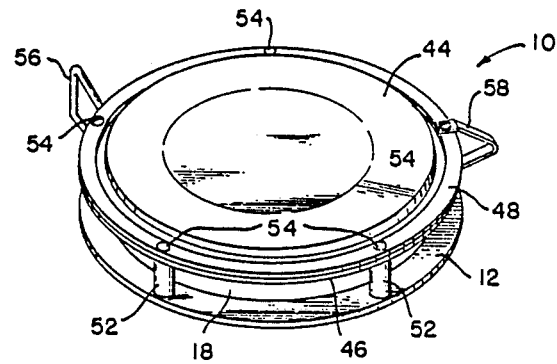
FIG. 3
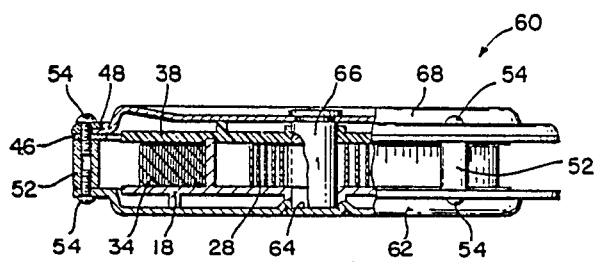
FIG. 4

TAPE MEASURE

REFERENCE TO RELATED APPLICATIONS

This application is a continuation-in-part of application Ser. No. 537,638, filed Sept. 30, 1983, now abandoned, which is a continuation-in-part of application Ser. No. 352,127, filed Feb. 25, 1982, now abandoned.

TECHNICAL FIELD

The present invention relates to gearless tape measure having an adjustable tension and brake.

BACKGROUND ART

Many types of spring-tension-rewind tape measures are available today. The longer tapes usually require manual rewinding to assist the spring; therefore, the tape measures include an external handle. This handle is in constant danger of being broken, lost, or damaged when the tape measure is used.

U.S. Pat. No. 3,054,573 discloses an improved tape measure which eliminates projecting parts, such as handles, by using gears within the tape to augment the spring tension. The spring and driving gears are separated in sealed compartments. Although an improvement over the external-handle tape measures, this gear-type tape measure still presents serious problems to economical construction and efficient use. For example, the gears of the tape measure can foul with dirt during logging and other uses of the tape measure. Modern improvements in spring metal have eliminated the necessity of using a gear system to provide the necessary spring tensioning force to retract even long tapes. The advent of the modern springs has allowed improvements to the tape measure, especially the removal of gears, which are incorporated in the improved tape measure of this invention.

DISCLOSURE OF INVENTION

A gearless, open-faced, direct-drive, spring-rewound tape measure is thinner and lighter than conventional prior art tape measures and can be produced more cheaply. Generally, the tape measure includes a pair of disk-shaped dust covers, spaced apart by a plurality of collars or spacer posts slightly more than the width of the tape. One cover includes a centrally disposed hub which projects inwardly with respect to the spaced pair of covers substantially perpendicular to the cover. A spool for holding a spring and tape measure includes a revolvable, spring-retaining disk which has a diameter slightly less than the diameter of the cover. The disk is rotatably mounted on the cover hub and has a spring-retaining well whose outer periphery is defined by an upraised wall. The wall is substantially concentric with the disk and has at least one slot to allow passage of the spring or tape through the wall. A spiral spring is retained within the well of the spring-retaining disk. One end of the spring is affixed to the hub, preferably by wrapping a tang portion of the spring about a corresponding surface of the hub. The other end of the spring is attached to a graduated tape. Usually, the tape passes through the slot in the wall of the spring-retaining disk and is wound about the outer periphery of the wall. Thus, the tape is exposed and the tape measure is "open-faced." The slotted wall protects the spring from fouling by dirt. The spool includes an input disk which is frictionally held to the spring-retaining wall. The input disk covers the spring and is of such diameter as to help guide the tape measure.

One of the pair of dust covers is larger than the other and includes the collars mounted about its periphery. The second cover is slightly smaller in diameter than the locus of the outer edge of the collars on the first cover and at least equal in diameter to the spool. The collars support the second cover, which is secured to them by means of a locking ring which is fastened to the collars and overlaps the periphery of the cover. The second cover may be rotated with respect to the first cover by loosening the fasteners, which ordinarily frictionally secure the second cover to the collars.

A key element of the invention is the ability to tension the tape measure spring with respect to the tape measure to achieve complete retrieval and a reasonable rate of return of the tape. Tensioning is accomplished by the relative rotation of the hub, holding the inner end of the spring, with respect to the tape end or spool. In general, the second, smaller diameter cover is loosened and rotated with respect to the larger diameter cover to tension the tape.

In a preferred embodiment, the hub is mounted on the smaller diameter cover. The tape end is of such dimension that it is secured by abutting a collar or by use of a braking mechanism. The fasteners securing the second cover are loosened and the cover rotated relative to the larger cover. Thus, the spring tension available for retrieving the tape is adjusted. The fasteners are then tightened to secure the second cover to the collars at the new tension setting.

In a second embodiment, the hub is fixed to the larger diameter cover. The second cover is of a resilient material capable of being compressed into contact with the spool upon which the tape and spring are mounted. The tape end is of such dimension that it may rotate held to the spool without being obstructed by the collars. Tension is adjusted by loosening the fasteners securing the second cover to the collars, compressing the cover into contact with the spool, and rotating the cover and spool together, whereby the spool, including the tape end, rotates relative to the spring-retaining hub.

To improve performance of the tape measure of this invention, a slide ridge may be added to the spring-retaining disk to abut the cover and to reduce the frictional surface area of contact between the spring-retaining disk and the cover. This slide ridge ensures that the spring-retaining disk is easier to revolve about the hub. Also, the input disk may include an inset groove to mate with the top of the wall so that the wall revolves in the groove in the input disk when the tape measure is assembled. This groove helps to limit wobble of the spring-retaining disk. Finally, the input disk may also include a plurality of stabilizers which project upwardly from the input disk between its top and the cover plate to reduce wobble of the input disk.

The tape measure may also include a friction brake which will hold the tape when it is pulled from the spring-retaining disk. The brake bears against the tape to counter the spring tension that seeks to automatically retract the tape.

Thus, a gearless, open-faced, direct-drive, spring-rewound tape measure is easily constructed and is a decided improvement over existing tape measures. The entire tape measure may be made from aluminum or plastic and, therefore, may be much lighter and less expensive. The tape measure is thinner than earlier tape measures because gears or handles are eliminated through use of the improved spiral spring. A simple and quick means is employed to adjust the spring tension without use of gears. The tape measure is less susceptible to fouling by dirt and is less susceptible to damage even when placed in heavy use.

BRIEF DESCRIPTION OF THE DRAWINGS

FIG. 2 is a typical cross section through a tape measure.

FIG. 3 is an isometric of a tape measure.

FIG. 4 is a typical cross section of a preferred tape measure.

BEST MODE FOR CARRYING OUT THE INVENTION

Figure 1:
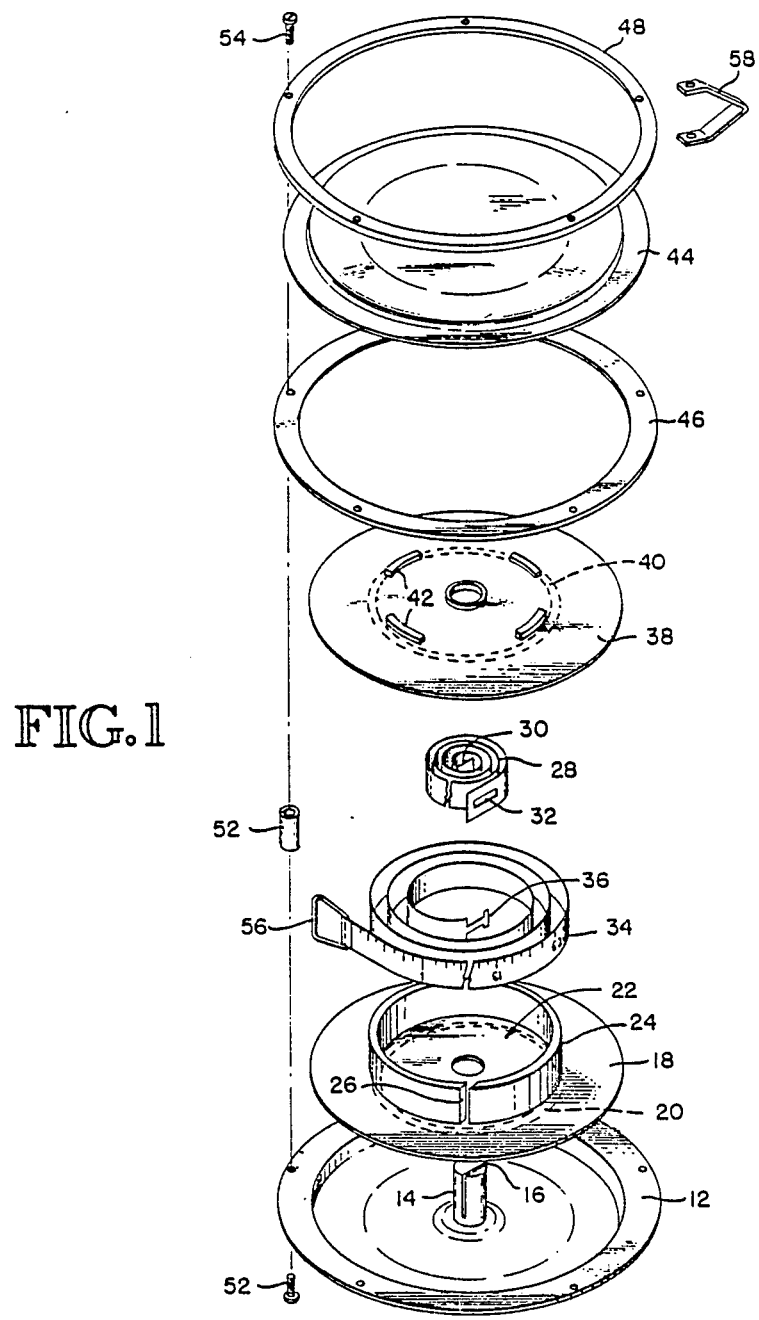
FIG. 1 is an exploded assembly drawing of a tape measure of this invention.

A gearless, open-faced, direct-drive, spring-rewound tape measure 10 has a cover 12 as a base. Positioned centrally within the disk-shaped cover 12 is a hub 14 having a slot 16 which is capable of receiving the tang of a spiral spring. The hub 14 projects upwardly substantially perpendicular to the cover 12 from one side of the cover 12. The hub 14 attaches to the cover 12 with a wedge and stake assembly (as best shown in FIG. 2). A spring-retaining disk 18 seats on the cover 12 around the hub 14. The inside diameter of the central opening of the spring-retaining disk is substantially equal to the outside diameter of the hub 14. To reduce the surface area of contact between the spring-retaining disk 18 and the cover 12, a slide ridge 20 depends downwardly from the spring-retaining disk 18. A spring-retaining well 22 is formed by an intermediate upraised wall 24. The wall 24 is substantially circular in plan view and extends upwardly a distance at least slightly greater than the thickness of the spring or tape. A slot 26 in the wall 24 of the spring-retaining disk 18 allows threading of the tape or spring through the wall so that the spring and tape may communicate between the spring-retaining well 22 and the outside of the spring-retaining disk 18.

A spiral spring 28 is placed within the spring-retaining well 22 and is affixed to the hub 14 by placing a tang 30 of the spring 28 into the slot 16 of the hub 14. A slot 32 is cut into the middle of the spring 28 at its other end. The tape 34 is generally a graduated measuring tape and has a tongue 36 that links with the slot 32 of the spring spring 28. Generally, the tape 24 is wound around the outer periphery of the wall 24 of the spring-retaining disk 18 (as shown in FIG. 2), thus making the assembled tape measure 10 "open-faced."

An input disk 38 rests above the spring-retaining disk 18. An inset groove 40 of the input disk 38 preferably mates with and is frictionally secured to the top of the wall 24 of the spring-retaining disk 18. The input disk 38 is of a diameter slightly less than that of the cover 12 and is generally equal to that of the spring-retaining disk 18. The spring-retaining disk 18 and the input disk 38 form a spool mounted upon the hub 14.

To stabilize the input disk 38 against wobble, preferably a plurality of spaced stabilizers 42 project upwardly from the top surface of the input disk 38 into the space between the input disk 38 and a cover plate.

The tape measure assembly further includes a generally disk-shaped cover plate 44 which is sandwiched between two compression lock rings 46 and 48. The cover plate 44 has a diameter slightly less than the diameter of the cover 12 and is capable of being compressed to contact the input disk 38 and to revolve the input disk 38 and spring-retaining disk 18 simultaneously to adjust the tension of the spring 28 within the spring-retaining well 22. The lock rings 46 and 48 have an outside diameter substantially equal to the diameter of the cover 12. In common use, the cover plate 44 is retained against revolution by the lock rings 46 and 48. A downwardly depending flange on the upper lock ring 48, as shown in FIG. 2, helps to retain the cover plate 44 between the lock rings 46 and 48.

Fasteners, such as a plurality of collars 52, are positioned about the periphery of the lock rings 46 and 48 and cover 12 to join the cover 12 and lock rings 46 and 48 in substantially parallel, axially aligned positions. Screws 54 are used to connect the cover 12 to the collars 52 and the lock rings 46 and 48 to the collars 52 (as best shown in FIG. 2). The screws 54 fit through corresponding openings on the cover 12 and lock rings 46 and 48 and thread into the spacer collars 52. The plurality of collars 52 help to confine the tape 34 within the outside diameter of the cover 12.

Referring to FIG. 1, to adjust the spring tension, the screws 54 connecting the lock rings 46 and 48 to the collars 52 are loosened to remove the compression of the upper lock ring 48 against the cover plate 44. When the screws are sufficiently loosened, the cover plate will be revolvable in its seat upon the lower lock ring 46. Pressing the center of the cover plate 44, which must be of a resilient material, against the input disk 38 will exert a downward force upon the spring-retaining disk so that revolution of the cover plate 44 relative to the cover 12 will simultaneously revolve the input disk 38 and the spring-retaining disk 18. The tape end fitting 56 is held against the spool during this operation and thus must be removable or of small enough dimensions to pass unobstructed by the collars 52. Because the tang 30 of the spiral spring 28 is retained in a slot 16 of the hub 14 and because the hub 14 is stationary, the spring 28 will become more tightly or more loosely wound, depending upon the direction of revolution, since the disk 18 revolves and the tape 34 passes through a slot 26 in the disk 18. Once a desired tension is achieved, the screws 52 are tightened to compress the rings 46 and 48 against the cover plate 44, thereby eliminating its revolution. The compression is then relieved, allowing the disks to revolve when the tape 34 is pulled.

Figure 5:
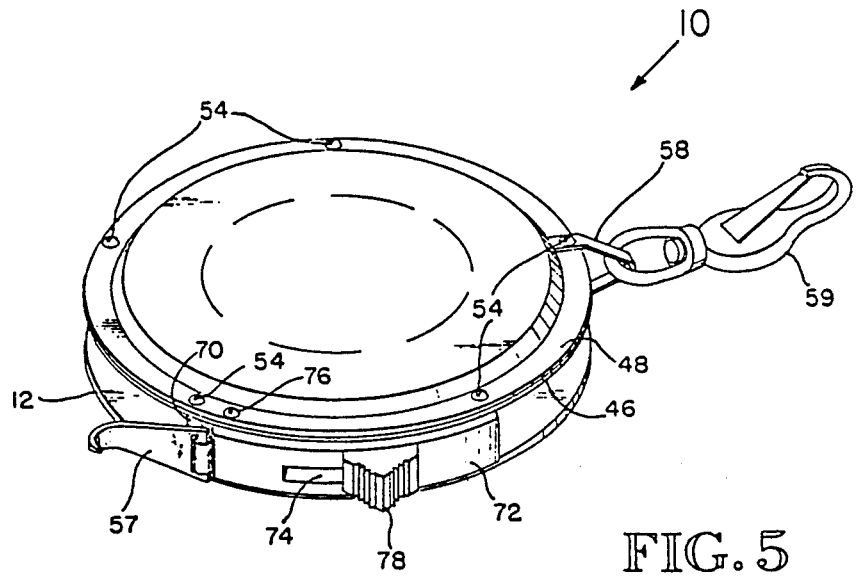
FIG. 5 is an isometric of a preferred tape measure including a brake.

The tape end fitting 56 or a hook 57 (FIG. 5) on the exposed end of the tape 34 constrains the tape end from entering the well 22. Also, there is sufficient friction within the assembled tape measure 10 to constrain the spring-retaining disk 18 from revolving until a sufficient force is supplied to withdraw the tape 34. That is, the pretensioning of the spring 28 never exceeds the static friction which the spring-retaining disk 18 has with respect to the cover 12. This predetermined static friction may be varied by the thickness of the slide ridge 20 or in other known ways.

A clip receiver 58 and clip 59 may be placed upon the tape measure 10 above and below the cover 12 and cover plate 44 at a collar 52.

Figure 9:
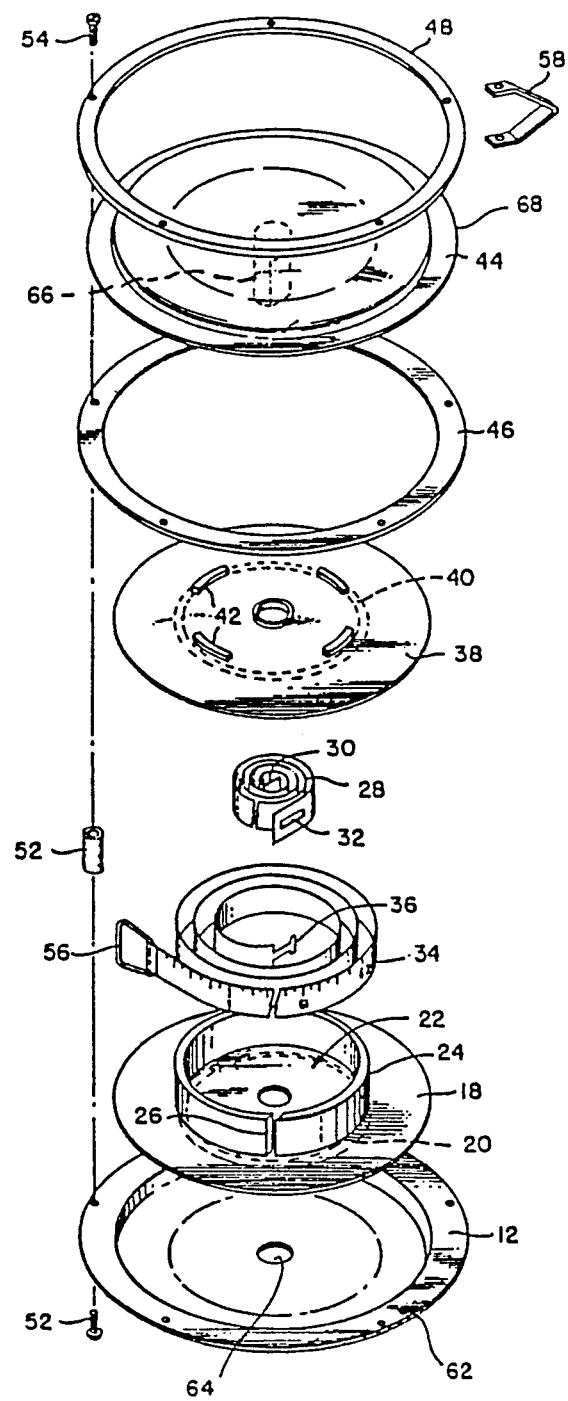
FIG. 9 is an exploded assembly drawing of the tape of FIG. 4.

As best shown in FIGS. 4 and 9, the preferred tape measure 60, in contrast to the embodiment just described, has a generally disk-shaped cover 62 that may have a central hub-receiving well 64. A spring-retaining disk 18 and input disk 38 with spring 28 and tape 34, as previously described, are mounted above the cover 62 and are held in position by a hub 66 which is downwardly depending from a cover plate 68. The cover plate 68 has a diameter slightly less than the diameter of the cover 62. As previously described, lock rings 46 and 48 are used to retain the cover plte 68. When the rings 46 and 48 are loosened, the cover plate may be turned to adjust the tension of the spring 28. The spring 28 is connected to the hub 66 and will be tightened or loosened as the hub 66 revolves because the spool, including spring-retaining disk 18, and disk 38 remain stationary. The tape end 56 abuts a collar 52 or brake means, thus holding the spool stationary. The well 64 has a diameter just slightly greater than the diameter of the hub 66.

Although shown with the spring-retaining disk 18 below the input disk 38, the order of these parts may be reversed. It is also apparent that either cover plate may be loosened to achieve tensioning. Tensioning requires only a relative rotation between the hub and the spool or tape end.

To reduce friction between the revolving parts and the stationary parts, a lubricant, such as graphite or oil, may be used, if desired. Also, to promote withdrawal and retraction of the tape 34, a collar 52 may include a nylon sleeve 70 which rotates when the tape 34 rubs against the sleeve.

Figure 10:
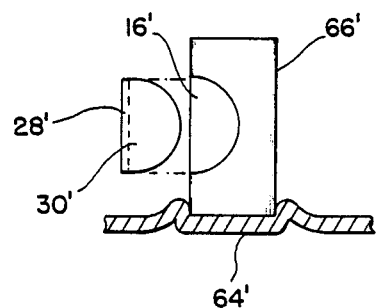
FIG. 10 shows a preferred hub for securing the inner end of the spring.

Referring to FIG. 10, a preferred hub 66' is shown which has an advantage over the hub 14 and slot 16 shown in FIG. 1 for retaining the inner end 30 of the spring 28. In the preferred hub 66', a circumferential surface 16' is provided for receiving the inner end 30' of the spring 28'. The surface 16' is a groove made, for example, by drilling a hole, offset from the axis of the hub, partially into the hub. A surface 16' is generated which is substantially radial to the hub 66'. The tang end 30' of the spring 28' is shaped to correspond to the surface 16'. In operation, the spring 28' is fixed to the hub 66' by tension, friction and relative position between the tang 30' and the retaining surface 16'. The advantage over the FIG. 1 arrangement is evident where there is an uncontrolled return of the tape which causes the spring to unwind further than normal. In FIG. 1 arrangements, the spring will likely break at the slot 16 attachment point.

In its FIG. 10 preferred arrangement, the spring end 30' will simply slip about the hub 66'. The tape may then be retensioned as described above, avoiding having to replace the spring.

Figure 6:
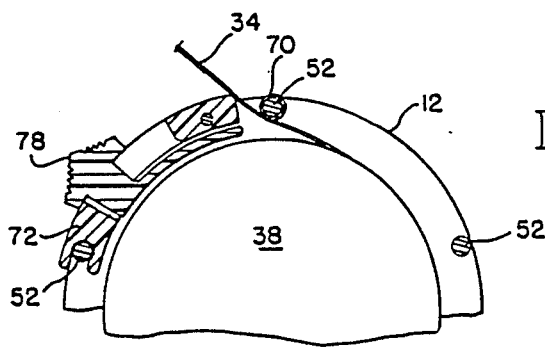
FIG. 6 is a sectional detail of a preferred brake in the retracted position.
Figure 7:
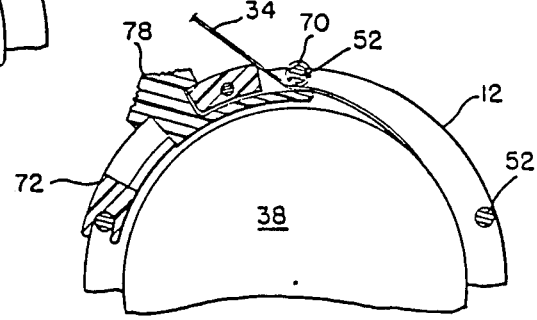
FIG. 7 is a sectional detail, similar to FIG. 6, showing the brake in the actuated position.
Figure 8:
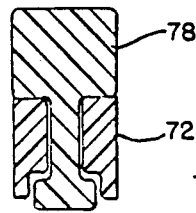
FIG. 8 is a sectional elevation of the brake of FIG. 6.

A brake mechanism preferably includes a nylon base 72 having a slot 74. The base fits between the cover 12 and the lower lock ring 46 and clips to a collar 52, as shown in FIGS. 6 and 7. The other end of the base 72 is attached with screws 76 to the cover 12 and lock rings 46 and 48. The base 72 ends before the next collar 52 to create an opening for the tape 34. A tongue 78 having an end which extends through the slot 74 may be moved to apply pressure against the tape 34 at a collar 52. As shown in FIG. 6, the tongue 78 is retracted and the tape 34 is free to wind or unwind. In FIG. 7, the tongue 78 engages the tape 34 and wedges it against the collar 52 to hold it. Other mechanisms for applying a brake for the tape measure will be apparent. The brake shown and described allows controlled rewinding of the tape by adjusting the friction encountered by the position of the tongue 78 in its slot 74.

While several embodiments have been shown and described, those skilled in the art will recognize modifications which can be made without departing from the inventive concept. Therefore, the claims should be interpreted liberally and should not be limited to the precise embodiments shown and described, unless limitation is necessary in view of the pertinent prior art.

I claim:

1. An improved gearless, open-spooled, direct-drive tape measure of the spring recoil type, including a means for adjusting tension of said spring relative to said tape measure, said tape measure having a spool including a flat wound recoil spring, a tape measure having one end attached to the outer end of said spring, said spool including a spring-retaining disk having a diameter at least about equal to the diameter of the retracted tape and spring together, said disk having a spring-retaining well on one side of the disk defined by a wall substantially concentric with the disk, said wall having a slot therein through which said spring and tape end may pass, said well holding said spring with said tape wound around the outside of the well wall, wherein the periphery of said disk guides rewinding of said tape, and an input disk having a diameter substantially equal to said spring-retaining disk, seated atop the wall of the spring well to retain said spring in the well, wherein the outer periphery of said input disk guides rewinding of said tape, said improved spring tension adjusting tape measure comprising:

a pair of covers for holding said spool between them, said covers spaced apart by a plurality of collars to accommodate the spool, said collars arranged about the periphery of said spool, one of said covers including a hub fixed to one face for rotationally mounting said spool and securing the inner end of said spring, said covers including:

a first cover, larger in diameter than said spool, to which one end of said collars is fixed, and a second cover, smaller in diameter than the locus of the outer edge of the diameters of said collars about said spool and at least equal in diameter to said spool;

at least one locking ring engageable with said second cover for securing said second cover to the opposite end of said collars fixed to said first cover, whereby said locking ring is of sufficient outer diameter to be fastened to said collars and has an inner diameter which overlaps the periphery of said second cover; and fastening means for securing said locking ring, while holding said second cover in position, to said collars and for securing said first cover to the opposite end of said collars, with the spool held between said covers, wherein loosening said fastening means securing either cover and rotating said cover with respect to the cover remaining secured to the collars cause relative rotation of the hub, to which one end of the spring is fastened, with respect to the tape end, whereby the tension of said spring with respect to said tape is adjusted.

2. The tape measure of claim 1 wherein said second cover includes said hub fixed to its inner face with respect to said tape, wherein, upon loosening fastening means securing said cover to said collars, holding said tape end and spool fixed and rotating said loosened cover relative to the other cover cause adjustment of said spring tension with respect to said tape.

3. The tape measure of claim 1 wherein said first cover includes said hub fixed to said inner face thereof with respect to said tape and said second cover is of resilient construction, wherein, upon loosening fastening means securing said second cover to said collars, depressing said second cover into contact with said spool and rotating the second cover into contact with said spool and rotating the second cover relative to the first cover, with said tape end rotating with said spool, cause adjustment of said spring tension with respect to said tape.

4. The tape measure of claim 1 having a brake means for retarding the rewinding rate of said tape or locking said tape in a fixed, extended position, said brake comprising:
   a tongue element including an actuating portion extending from the periphery of said covers and a tongue portion for directly locking said tape against one of said collar means; and
   means for mounting said tongue on the periphery of said covers between adjacent collars, wherein said tongue can slide toward and retract from one of said collars, wherein said tape passes freely between said tongue element and said collar while said tongue is in its retracted position, and said tape may be restrained or locked against the collar by sliding said tongue toward said collar, whereby said tongue urges said tape into frictional contact with the collar.

5. The tape measure of claim 1 wherein said second cover is secured to said collars by means of two locking rings, with the outer periphery of said covers sandwiched between said rings, wherein loosening said fasteners permits said second cover to be rotated with respect to said first cover.

6. The tape measure of claim 1 wherein the hub includes a circumferential surface portion for receiving the inner end of said spring and said spring end wraps said hub in contact with the spring circumferential surface, said spring end including a spring end portion corresponding to said hub portion, whereby said spring is held fixed to the hub by friction and spring tension during operation of said tape measure but detaches without damage from the hub if the tape returns so rapidly that an uncontrolled unwinding of the spring occurs.

7. The tape measure of claim 4 wherein the brake mounting means further includes a base, means on the base for connecting one end of the base to one fastener, and a slot in the base to receive the tongue so that the brake is actuated by sliding the tongue circumferentially about the cover inthe slot of the base toward an adjacent fastener, whereby said tape is urged into frictional contact with said second fastener by operation of said tongue.

8. The tape measure of claim 4 wherein the brake means includes a base, means on the base for connecting one end of the base to one collar, a slot in the base, and a tongue received in the slot, the tongue having an actuator end projecting radially outwardly from the periphery of the cover and a tape-contacting end so that the brake is actuated by sliding the actuator end circumferentially about the cover in the slot to bear the tape-contacting end of the tongue against the tape, which is urged into frictional contact with a collar having a rotatable surface.

* * * * *